No. 670,296. Patented Mar. 19, 1901.
R. A. RICHARDSON.
EGG BOILER.
(Application filed Feb. 19, 1900.)
(No Model.)
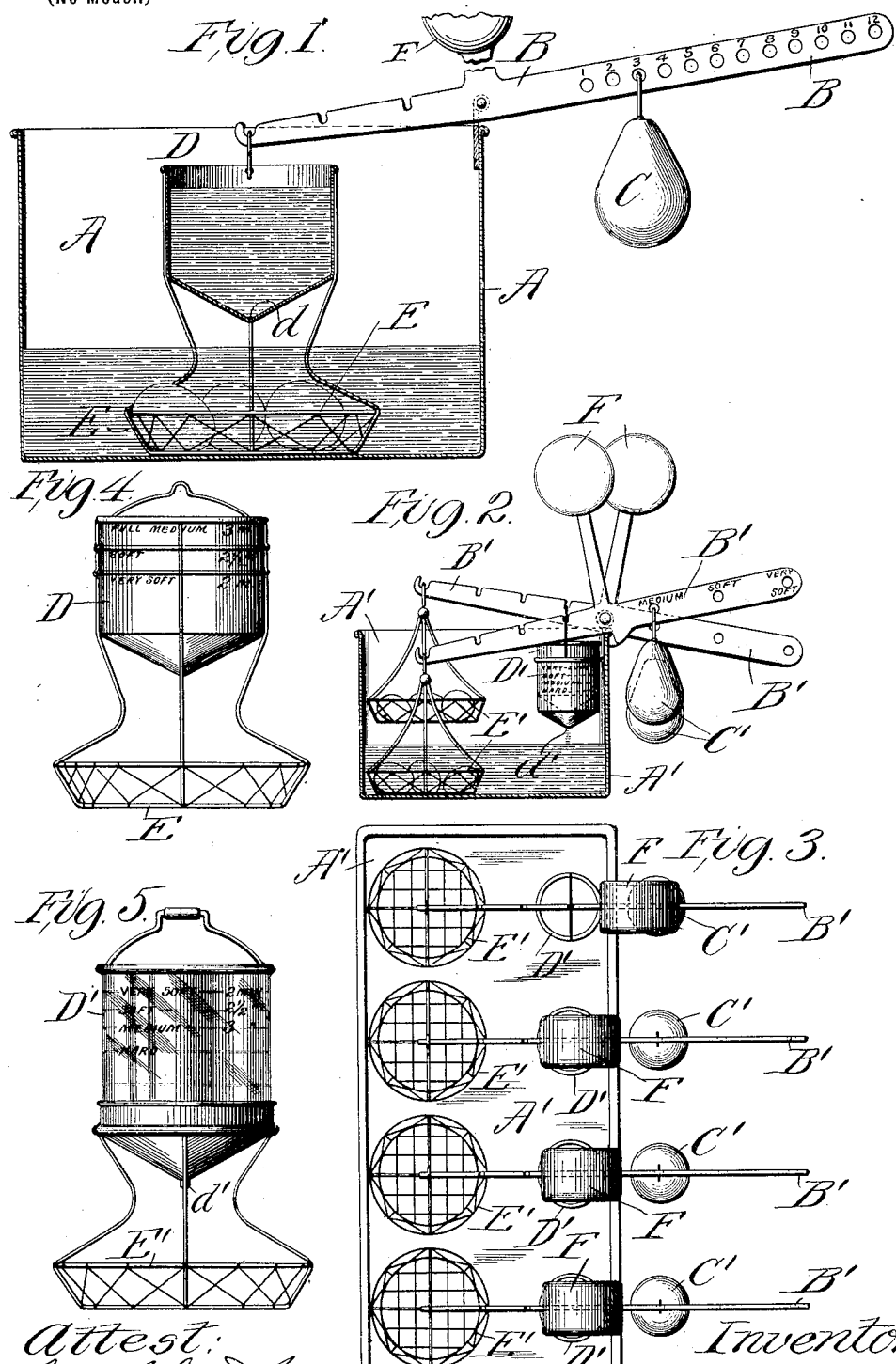
Attest:
Wm. H. Scott
Ralph Walsh
Inventor:
Russell A. Richardson,
by Bakewell & Cornwall
Atty's.

UNITED STATES PATENT OFFICE.

RUSSELL A. RICHARDSON, OF ST. LOUIS, MISSOURI.

EGG-BOILER.

SPECIFICATION forming part of Letters Patent No. 670,296, dated March 19, 1901.

Application filed February 19, 1900. Serial No. 5,812. (No model.)

*To all whom it may concern:*

Be it known that I, RUSSELL A. RICHARDSON, a citizen of the United States, residing at the city of St. Louis, State of Missouri, have invented a certain new and useful Improvement in Egg-Boilers, of which the following is a full, clear, and exact description, such as will enable others skilled in the art to which it appertains to make and use the same, reference being had to the accompanying drawings, forming part of this specification, in which—

Figure 1 is a vertical sectional view through my improved egg-boiler. Fig. 2 is a similar view through a modified form of egg-boiler. Fig. 3 is a top plan view showing the modified form of egg-boiler arranged as a battery. Fig. 4 is a side elevational view of the vessel for containing liquid and which is attached to the lever shown in Fig. 1, and Fig. 5 is a side elevational view of the vessel for containing liquid and which is attached to the levers shown in Figs. 2 and 3.

The invention consists in the construction, arrangement, and combination of the several parts, all as will hereinafter be described, and afterward pointed out in the claims.

In the drawings, A indicates a vessel designed to hold the water or other medium in which the eggs are to be cooked.

B indicates a lever fulcrumed on some suitable support, preferably the edge of the vessel A, which lever, as shown in Fig. 1, is provided in its outer end with a series of openings, (or they may be notches in the top of the lever,) which openings (or notches) are numbered from "1" to "12," or any suitable numbering may be employed.

C indicates a weight having a hook or other appropriate device for coöperating with the outer end of lever B, said weight being designed to be attached to said lever at a point indicated by one of the several numbers stamped or otherwise impressed on the lever. The inner end of lever B is provided with a hook or recessed portion, and suspended from said inner end is a vessel or receptacle D, which carries an egg-basket E. Vessel D is designed to hold water, preferably that taken from the vessel A, or, in other words, hot water, and the lower end of vessel D is preferably inclined or formed with a conical end which is punctured at *d* with a small opening through which the liquid or other contents of vessel D is designed to escape.

Vessel D is preferably marked by horizontal lines and has impressed thereon words to the effect that full measure thereof will cause the eggs to remain in the boiling water three minutes, or "Full medium 3 M," or if the vessel is filled to the line marked "Soft 2½ M" the eggs in the basket will remain in the boiling water two and one-half minutes and be cooked soft, and if the vessel D is filled to the line marked "Very soft 2 M" the eggs in the basket will remain in the basket two minutes and be cooked very soft.

The operation of the construction above described is as follows: The form of egg-boiler shown in Fig. 1 is what I designate as a "family" egg-boiler in that the weight C is designed to be attached to the outer end of lever B, depending upon the number of eggs to be cooked in basket E. As shown, there are three eggs in basket E, and the weight C is attached to the outer end of lever B at the point marked "3." Were six eggs placed in the basket E, weight C should be attached to the lever B at a point marked "6." If it is desired to cook the eggs three minutes, the water in vessel A is first heated to the desired point and the basket, with its eggs, placed in position on the inner end of lever B. Vessel D is now filled, preferably with hot water from the boiler A, to overflowing, and this water in vessel D escapes through the opening *d*, the opening being of such size that the length of time required for the weight C to overbalance the basket and raise it out of the boiling water is three minutes. The eggs will therefore be submerged for a period of three minutes, when the overbalancing-weight C will operate to elevate the inner end of lever B and raise the vessel D and its basket E out of the water in vessel A. If it is desired to cook the eggs for two and one-half minutes or two minutes, the vessel D is filled to the proper mark and the basket will be raised out of the boiling water at the end of the time designated by the mark on the vessel D, up to which point said vessel was filled originally.

In Figs. 2 and 3 I have shown a modified construction wherein A' indicates the vessel designed to contain the boiling water, B' a lever fulcrumed on some suitable support, preferably the edge of vessel A', and C' a weight designed to be attached to the outer end of lever B' at points marked "Medium," "Soft," and "Very soft," or other suitable words indicating the condition in which it is desired the cooked eggs shall be.

The vessel D' is removably supported on the inner end of lever B' and in this form is preferably separate from the basket E'. The vessel D' is designed to be filled with hot water from the vessel A, and when the eggs are in the basket the contents of vessel D' escape to such an extent that the weight C' will overbalance the inner end of the lever and elevate the basket, so as to raise the eggs out of the cooking medium. By adjusting the weight C' at different points along the outer end of lever B' the basket will be automatically elevated, and the eggs cooked medium (three minutes) when the weight is attached to the lever at a point marked "Medium" or "Soft," two and one-half minutes when the weight is attached to the lever at the point marked "Soft" or "Very soft," and two minutes when the weight is attached to the lever at the point marked "Very soft." Where a battery of boilers is arranged as shown in Fig. 3, it will be obvious that the position of weight C' need not be changed except when occasion requires. This is desirable in instances where eggs have to be cooked to different degrees, as in hotels, where the weights can be once adjusted for a certain number of eggs and the size of the opening d' made according to the degree to which the eggs will be cooked in that particular boiler.

It is obvious that other adjustment than that mentioned may be made—as, for instance, with respect to Fig. 2 the vessel D' can be adjusted at different points along the inner end of lever B to effect the time in which the basket will be elevated. In such a construction the weight C' would remain fixed, and were the vessel D' placed near the extremity of the inner end of lever B'. Of course the lever is thrown before all the contents escape from the vessel D'.

If desired, a weight F can be arranged above the fulcrum of levers B or B' to effect a complete movement of the levers in one direction or the other, as said weight F moves to one or the other side of a vertical line above the fulcrum of said lever.

It is obvious that the vessel D' can be marked with a scale similar to the construction shown in Fig. 1, so that if for any reason the moving parts of the apparatus should get out of order the attendant could tell by watching the water-line of the liquid contents of vessel D', and after said vessel had been filled upon reaching the first line nearest the top two minutes would have passed, the next line two and one-half minutes, and the next line three minutes, and so on, so that the attendant would know when to remove the basket containing the eggs upon said eggs having remained in the water a certain length of time and cooked to a certain extent.

I am aware that minor changes in the arrangements, construction, and combination of several parts of my device can be made and substituted for those herein shown and described without in the least departing from the nature and principle of my invention.

Having thus described my invention, what I claim, and desire to secure by Letters Patent, is—

1. In an egg-boiler, the combination with a receptacle for containing the boiling water, of a lever pivoted in juxtaposition to said receptacle, an overbalancing-weight which coöperates with the outer end of said lever, and is designed to be attached thereto at different points, a receptacle arranged on the inner arm of the lever, a basket for containing the articles to be cooked which is submerged in the water of the cooking utensil when liquid is poured in the vessel suspended from the inner end of the lever, and indication-marks on the vessel which is suspended from the inner end of the lever; substantially as described.

2. The combination with a lever, of a weight F arranged above the fulcrum thereof and designed to be thrown on each side of a vertical line drawn through said fulcrum when the lever moves from one position to the other, of an overbalancing-weight on one arm of said lever, a basket on the opposite end of said lever, and a vessel secured to said lever and provided with an opening at its bottom for the escape of the contents of said vessel; substantially as described.

3. The herein-described vessel for determining the period eggs are submerged in water while being cooked, said vessel being open to receive appropriate contents whenever the same is used, and said vessel being provided at its lower end with an opening for the escape of its contents so introduced, and a scale or indication-marks for indicating the length of time consumed by, and the volume of, the contents escaping through said opening; substantially as described.

4. The combination with a vessel D for containing a liquid, said vessel being provided with an opening in its bottom for the escape of its liquid contents, a scale arranged in connection with said vessel for indicating time by the level of the liquid contents of said vessel, and a basket for containing articles to be cooked, said basket being attached to the under side of, or suspended from, said vessel, whereby its contents are wholly submerged in a cooking medium during the entire period of escape of the liquid contents from vessel D; substantially as described.

In testimony whereof I hereunto affix my signature, in the presence of two witnesses, this 16th day of February, 1900.

RUSSELL A. RICHARDSON.

Witnesses:
WM. A. SCOTT,
F. R. CORNWALL.